US011075581B2

(12) United States Patent
Smith et al.

(10) Patent No.: US 11,075,581 B2
(45) Date of Patent: Jul. 27, 2021

(54) METHODS AND APPARATUS TO USE A SWITCHED-MODE POWER SUPPLY AS A SOURCE OF POWER IN A SERVICE PACK

(71) Applicant: Illinois Tool Works Inc., Glenview, IL (US)

(72) Inventors: Alan F. Smith, Fremont, WI (US); Nathan J. Jochman, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 16/513,127

(22) Filed: Jul. 16, 2019

(65) Prior Publication Data

US 2020/0028439 A1    Jan. 23, 2020

Related U.S. Application Data

(60) Provisional application No. 62/700,037, filed on Jul. 18, 2018.

(51) Int. Cl.
*H02M 3/335* (2006.01)
*H02M 3/157* (2006.01)
*B60K 25/02* (2006.01)

(52) U.S. Cl.
CPC ......... *H02M 3/33507* (2013.01); *B60K 25/02* (2013.01); *H02M 3/157* (2013.01); *B60K 2025/022* (2013.01)

(58) Field of Classification Search
CPC . B60R 16/03; H02J 7/00; B66C 13/22; B66C 13/18; B66C 23/44; B66C 23/38;
(Continued)

(56) References Cited

U.S. PATENT DOCUMENTS 9,698,598 B2 * 7/2017 Ballatine .................. B60L 53/67
2005/0067900 A1 * 3/2005 Bailey .................. B60H 1/00364
307/45

(Continued)

FOREIGN PATENT DOCUMENTS

EP          2086784          8/2009
WO       2008067252 A2      6/2008
(Continued)

OTHER PUBLICATIONS

PCT, Notification of Transmittal of the International Search Report and the Written Opinion of the International Searching Authority, or the Declaration, dated Nov. 4, 2019 (13 pages).

(Continued)

*Primary Examiner* — Thienvu V Tran
*Assistant Examiner* — Shahzeb K Ahmad
(74) *Attorney, Agent, or Firm* — McAndrews, Held & Malloy, Ltd.

(57) ABSTRACT

Methods and apparatus to use a switched-mode power supply as a source of power in a service pack are disclosed. An example power system includes: an engine; a generator configured to generate electrical power from mechanical power delivered by the engine; a switched-mode power supply configured to convert the electrical power from the generator to output power; and control circuitry configured to: when an output load of the switched-mode power supply is a power system load, control the switched-mode power supply to provide the output power for output to the power system load; and when the output load of the switched-mode power supply is a vehicle load, control the switched-mode power supply to provide the output power for output to a vehicle electrical system connected to a vehicle energy storage device.

11 Claims, 3 Drawing Sheets

(58) Field of Classification Search
CPC .... H02M 3/33507; H02M 3/157; H02M 7/04; B23K 37/0294
See application file for complete search history.

(56) References Cited

U.S. PATENT DOCUMENTS

| | | | | |
|---|---|---|---|---|
| 2010/0044192 | A1* | 2/2010 | Wang | H01H 50/323 |
| | | | | 200/50.32 |
| 2010/0318283 | A1* | 12/2010 | Renner | F02N 11/0829 |
| | | | | 701/112 |
| 2012/0029775 | A1 | 2/2012 | Peters | |
| 2013/0279212 | A1* | 10/2013 | Leadingham | H02M 5/458 |
| | | | | 363/37 |
| 2018/0043784 | A1* | 2/2018 | Lewis | H02J 7/00712 |
| 2018/0056902 | A1 | 3/2018 | Trinkner | |
| 2018/0072179 | A1* | 3/2018 | Burkman | H02H 9/041 |
| 2019/0047560 | A1* | 2/2019 | Kinoshita | B60W 30/10 |
| 2019/0260225 | A1* | 8/2019 | Hida | B60L 50/60 |
| 2020/0023794 | A1* | 1/2020 | Maekawa | B60R 16/03 |
| 2020/0091710 | A1* | 3/2020 | Heinemann | H02H 3/08 |

FOREIGN PATENT DOCUMENTS

| | | |
|---|---|---|
| WO | 2008067252 A3 | 6/2008 |
| WO | 2009099908 A1 | 8/2009 |
| WO | 2014035455 A1 | 3/2014 |

OTHER PUBLICATIONS

PCT, Notification Concerning Transmittal of International Preliminary Report on Patentability, in Application No. PCT/US2019/042156, dated Jan. 28, 2021 (8 pages).

* cited by examiner

METHODS AND APPARATUS TO USE A SWITCHED-MODE POWER SUPPLY AS A SOURCE OF POWER IN A SERVICE PACK

BACKGROUND

This disclosure relates generally to work vehicles, and more particularly to methods and apparatus to use a switched-mode power supply as a source of power in a service pack.

In general, the power output of a gasoline or diesel powered internal combustion engine is proportional to the engine speed. The engine of conventional engine-powered power sources typically runs at an idle speed such as 1500 rpm, 1800 rpm, or 2400 rpm, when the machine is not loaded. When a load is applied, the engine speed is increased to supply power to the load.

SUMMARY

Methods and apparatus to use a switched-mode power supply as a source of power in a service pack are disclosed, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

Conventional work trucks, mechanics trucks, and/or other vehicles have tools and equipment for making field repairs to machinery such as construction equipment. Some such equipment on a conventional work truck is powered by 12 VDC and/or 24 VDC truck electrical systems. Example tools include work lights, a crane or other type of lifting device, a winch, and/or other electrically-operated power tools. When the truck is at a work site, it is desirable to shut down the engine of the truck to reduce the number of running hours of the engine. However, powering 12 VDC or 24 VDC loads (e.g., heating, ventilation, and/or air conditioning loads, audio systems, and/or other electrical functions of the vehicle such as electrically powered windows, wipers, lights, etc.) with the truck while the engine is off rapidly discharges the truck battery if techniques are not employed to maintain the charge in the truck battery.

Disclosed example methods and apparatus supply power for 12 VDC or 24 VDC loads and/or maintain the truck battery in a charged state when a 12 VDC or 24 VDC load on the truck electrical system, without running the truck engine. Disclosed examples include a truck mounted service pack, including an engine, a generator, and circuitry configured to provide welding-type power, to provide electrical power to the vehicle electrical system. When the truck battery voltage falls to a predetermined level, the service pack engine may be started, and the service pack supplies power to the 12 VDC or 24 VDC loads and/or maintains the truck battery charge level.

Disclosed example methods and apparatus involve providing output power from a switched-mode power supply, which is powered using an engine-powered generator. The switched-mode power supply may be controlled to provide power appropriate to a given load, such as welding-type power for welding-type loads, battery-charging power for external battery-charging loads, engine jump starting power, and/or vehicle-based electrical loads. The same switched-mode power supply may be controlled to charging external batteries, jump starting external vehicles or other engine-driven equipment, and/or maintaining the 12 VDC or 24 VDC electrical system of the vehicle (e.g., providing power to any loads on the truck electrical system and charging the truck battery). The switched-mode power supply provides a light-weight and physically compact power supply, which can be electronically controlled. As a result, the service pack can be easily controlled to service a wide variety of output loads.

Because welding and battery charge outputs are infrequently used in practice, the switched-mode power supply circuitry used to provide welding and battery charging output in disclosed methods and apparatus are also used to power electrical loads on the vehicle and/or to maintain the vehicle battery charge state when not being used for other purposes. Disclosed examples may omit an alternator which, in conventional service packs, is a costly high-output alternator configured to supply 100 amperes or more.

Welding-type power, as used herein, refers to power suitable for welding, plasma cutting, induction heating, electrode preheating, CAC-A and/or hot wire welding/preheating (including laser welding and laser cladding).

As used herein, the terms "power system," "service pack" and "auxiliary power unit" refer to an engine driven power source which may be auxiliary or supplemental to a primary power source such as a vehicle engine.

Disclosed example power systems include: an engine; a generator configured to generate electrical power from mechanical power delivered by the engine; a switched-mode power supply configured to convert the electrical power from the generator to output power; and control circuitry configured to: when an output load of the switched-mode power supply is a power system load, control the switched-mode power supply to provide the output power for output to the power system load; and when the output load of the switched-mode power supply is a vehicle load, control the switched-mode power supply to provide the output power for output to a vehicle electrical system connected to a vehicle energy storage device.

Some example power systems further include a first contactor configured to selectively isolate the switched-mode power supply from the vehicle electrical system and a second contactor configured to selectively couple the switched-mode power supply to output terminals for the power system, and the control circuitry is configured to control the first contactor to isolate the switched-mode power supply from the vehicle electrical system and control the second contactor to couple the switched-mode power supply to the output terminals when the output load is the power system load. In some examples, the control circuitry is configured to control the first contactor to couple the switched-mode power supply to the vehicle electrical system and control the second contactor to isolate the switched-mode power supply from the output terminals when the output load is the vehicle load. Some examples further include an interlock configured to prevent connection of the switched-mode power supply to the vehicle electrical system while the second contactor is coupling the switched-mode power supply to the output terminals.

In some example power systems, the vehicle load includes at least one of charging the vehicle energy storage device, jump starting the vehicle energy storage device or another vehicle energy storage device, or an electrical load on the vehicle electrical system. In some example power systems, the power system load includes at least one of a welding-type load, a battery charging load, a direct current load, a pneumatic load, a hydraulic load, or an alternating current load. In some examples, the control circuit is configured to: determine a power system load is present; and in response to determining that the power system load is present, control the switched-mode power supply to provide the output power to the power system load.

In some example power systems, the power system does not include an alternator. In some examples, the control circuitry is configured to identify the power system load or the vehicle load based on an input from a user input device. In some examples, the control circuitry is configured to identify the power system load or the vehicle load based on detecting the power system load via a first sensor or the vehicle load via a second sensor. In some example power systems, the control circuitry is configured to identify the power system load or the vehicle load as the output load for the switched-mode power supply.

Figure 1:
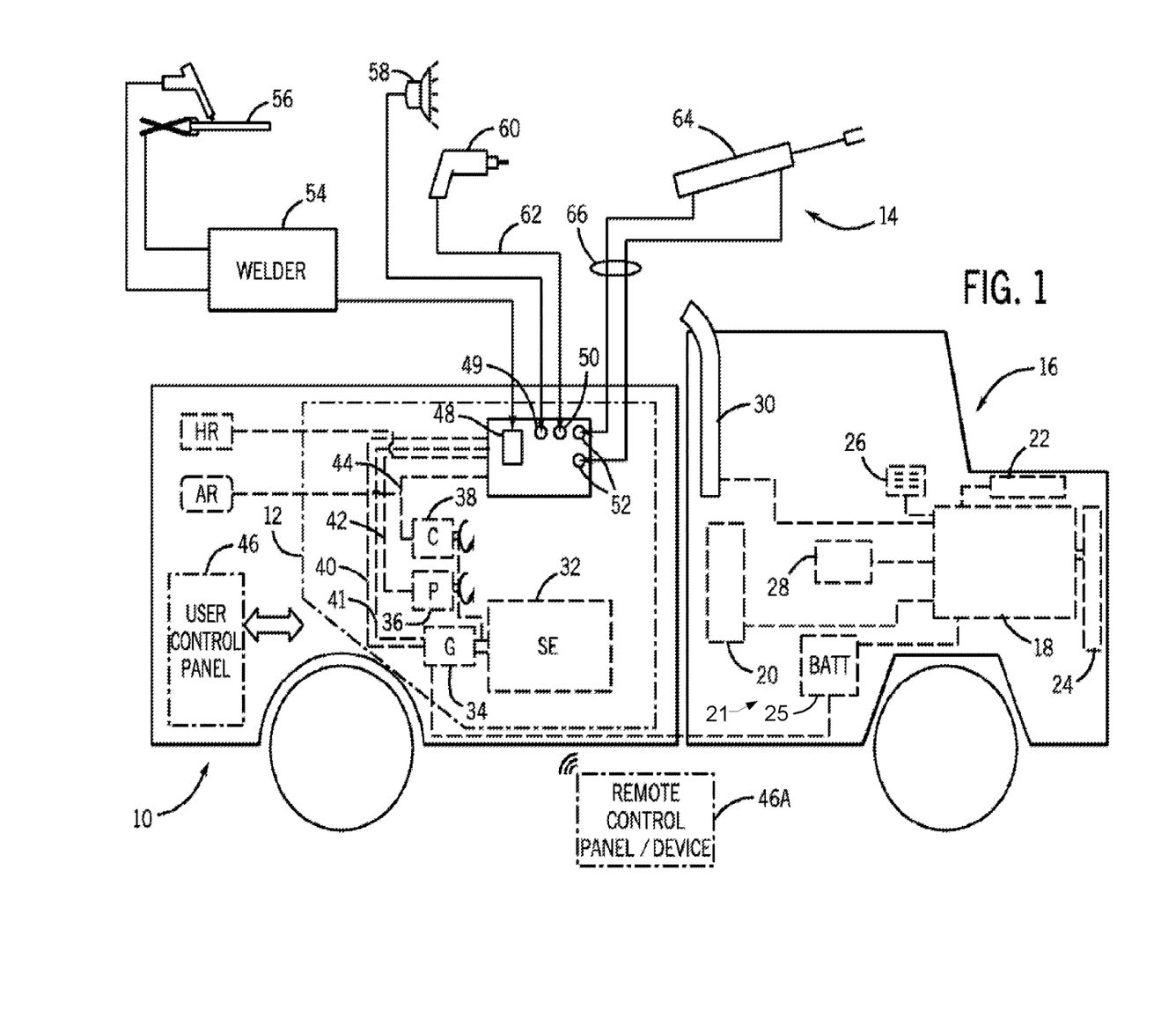
FIG. 1 is a diagrammatical overview of a work vehicle in which a service pack is installed, in accordance with aspects of the present disclosure.

Turning now to the drawings, and referring first to FIG. 1, a work vehicle 10 is illustrated. The work vehicle 10 is shown as a work truck, although any suitable configuration for the vehicle may be envisaged. In the illustrated embodiment, the vehicle includes a service pack, designated generally by reference numeral 12 for supplying electrical, compressed air and hydraulic power to a range of applications, designated generally by reference numeral 14. The work vehicle 10 has a main vehicle power plant 16 based around a vehicle engine 18. Example work vehicle engines of this type may be diesel engines, gasoline engines, and/or mixed ethanol-gasoline engines.

The vehicle power plant 16 includes a number of conventional support systems. For example, the engine 18 will consume fuel from a fuel reservoir 20, typically one or more liquid fuel tanks. An air intake or air cleaning system 22 supplies air to engine 18, which may, in some applications, be turbo charged or super charged. A cooling system 24, which will typically include a radiator, circulation pump, a thermostat-controlled valve and a fan, provides for cooling the engine. An electrical system includes an alternator or generator, along with one or more system batteries, cabling for these systems, cable assemblies routing power to a fuse box or other distribution system, and so forth. A lube oil system 28 will typically be included for many engine types, such as for diesel engines. As will be appreciated by those skilled in the art, such lube oil systems typically draw oil from the diesel engine crankcase, and circulate the oil through a filter and cooler, if present, to maintain the oil in good working condition. Finally, the power plant 16 will be served by an exhaust system 30 which may include catalytic converters, mufflers, and associated conduits.

The service pack 12 may include one or more service systems driven by a service engine 32. In some examples, the service pack 12 provides electrical power, hydraulic power and compressed air for the applications 14. In the diagrammatical representation of FIG. 1, for example, the service engine drives a generator 34 as well as a hydraulic pump 36 and air compressor 38. The engine itself may be of any desired type, but in a present embodiment a diesel engine is contemplated. Certain examples may use gasoline, diesel, natural gas, liquid petroleum gas, and/or other engines. The generator 34 may be directly driven by the service engine 32, such as by close coupling the generator 34 to the service engine 32, or may be belt or chain driven, where desired. Presently contemplated generators include three-phase brushless types, capable of producing power for a range of applications. However, other generators may be employed, including single-phase generators and generators capable of producing multiple power outputs. The hydraulic pump 36 may be based on any conventional technology, such as piston pumps, gear pumps, vane pumps, with or without closed-loop control of pressure and/or flow. The air compressor 38 may also be of any suitable type, such as a rotary screw air compressor or a reciprocating compressor based upon one or more reciprocating pistons.

The systems of the service pack 12 will include appropriate conduits, wiring, tubing and so forth for conveying the service generated by these components to an access point. Convenient access points will be located around the periphery of the vehicle. In a presently contemplated embodiment, all of the services may be routed to a common access point, although multiple access points can certainly be envisaged. The diagrammatical view of FIG. 1 illustrates the generator 34 as being coupled to electrical cabling 40 (for AC power supply) and 41 (for 12 volt DC power supply), whereas the hydraulic pump 36 is coupled to hydraulic circuit 42, air compressor 38 is coupled to an air circuit 44. As will be appreciated by those skilled in the art, the wiring and circuitry for all three systems will typically include protective circuits for the electrical power, including fuses, circuit breakers, and so forth, as well as valving for the hydraulic and air service. For the supply of electrical power, certain types of power may be conditioned (e.g., smoothed, filtered, etc.), and 12 volt power output may be provided by rectification, filtering and regulating of AC output. Valving for hydraulic power output may include by way example, pressure relief valves, check valves, shut-off valves, as well as directional control valving. Moreover, it should be understood that, although not represented specifically in FIG. 1, the hydraulic pump will draw fluid from and return fluid to a fluid reservoir, which will typically include an appropriate vent for the exchange of air during use with the interior volume of the reservoir, as well as a strainer or filter for the hydraulic fluid. Similarly, the air compressor 38 will typically draw air from the environment through an air filter (not shown).

In some examples, the generator 34 is also coupled to the vehicle electrical system, and particularly to the vehicle battery. Thus, as described below, not only may the service pack 12 allow for 12 VDC and/or 24 VDC loads to be powered without operation of the main vehicle engine 18, but the vehicle battery may serve as a shared battery, and is maintained in a good state of charge by the service pack generator output.

The cabling and conduits 40, 41, 42 and 44 may, as in the illustrated embodiment, route service for all of these systems directly from connections on the service pack 12. In a presently contemplated embodiment, for example, connections are provided at or near a base of an enclosure of the service pack 12, such that connections can be easily made without the need to open the enclosure. Moreover, certain control functions may be available from a control and service panel 46. The service panel 46, as noted above, may be located on any surface of the vehicle, or on multiple locations in the vehicle, and may be covered by doors or other protective structures, where desired. There is no requirement, generally, that the service panel 46 be located at the same location, or even near the locations of access to the electrical, hydraulic or compressed air output points of the service pack. In a presently contemplated embodiment, the panel is provided in a rear compartment covered by an access door. The control and service panel 46 may permit, for example, starting and stopping of the service engine 32 by a keyed ignition or starter button. Other controls for the engine may also be provided on the control and service panel 46. The control and service panel 46 may also provide operator interfaces for monitoring the service engine 32, such as fuel level gages, pressure gages, as well as various lights and indicators for parameters such as pressure, speed, and so forth. The service panel may also include a stop, disconnect or disable switch (not separately shown) that allows the operator to prevent starting of the service engine 32, such as during transport.

As also illustrated in FIG. 1, a remote control panel or device 46A may also be provided that may communicate with the service panel 46 or directly with the service pack via cabling or wirelessly. In a manner similar to conventional crane or manlift controls, then, the operator may start and stop the service engine 32, and control certain functions of the service pack (e.g., engagement or disengagement of a clutched component, such as an air compressor) without directly accessing either the components within the service pack enclosure or the service panel 46.

As noted above, any desired location may be selected as a convenient access point for one or more of the systems of the service pack. In the illustrated embodiment, for example, one or more alternating current electrical outputs, which may take the form of electrical receptacles 48 (for AC power, such as 120 VAC and/or 240 VAC power) and 49 (for DC power, such as 12 VDC and/or 24 VDC power) are provided. The service panel 46 may enable a user to select output configurations for the receptacles 48, 49. Similarly, one or more pneumatic connections, typically in the form of a quick disconnect fitting may be provided as indicated at reference numeral 50. Similarly, hydraulic power and return connections 52 may be provided, which may also take the form of quick disconnect fittings.

In the embodiment illustrated in FIG. 1, the applications 14 may be coupled to the service pack 12 by interfacing with the outputs provided by receptacle 48. For example, a portable welder 54 may be coupled to the AC receptacle 48, and may provide constant current or constant voltage-regulated power suitable for a welding application. As will be appreciated by those skilled in the art, the welder 54 itself may receive power from the electrical output of the generator, and itself contain circuitry designed to provide for appropriate regulation of the output power provided to cables suitable for a welding application 56. Some examples include welders, plasma cutters, and so forth, which may operate in accordance with any one of many conventional welding techniques, such as gas metal arc welding (GMAW), shielded metal arc welding (SMAW), flux-cored arc welding (FCAW), gas tungsten arc welding (GTAW), and so forth. Although not illustrated in FIG. 1, certain of these welding techniques may call for or conveniently use wire feeders to supply a continuously fed wire electrode, as well as shielding gasses and other shielding supplies. Such wire feeders may be coupled to the service pack 12 and powered by the service pack 12, where desired.

Similarly, DC loads may be coupled to the DC receptacle 49. Such loads may include lights 58, or any other loads that would otherwise be powered by operation of the main vehicle engine. It should also be noted that, as mentioned above, the 12 volt DC output of the service pack also serves to maintain the vehicle battery charge, and to power any ancillary loads that the operator may need during work (e.g., cab lights, hydraulic system controls, etc.).

The pneumatic and hydraulic applications may be similarly be coupled to the service pack as illustrated diagrammatically in FIG. 1. For example, a hose 62 or other conduit may be routed from the compressed air source at the outlet 50 to a tool, such as an impact wrench 60. Many such pneumatic loads may be envisaged. Similarly, a hydraulic load, illustrated in the form of a reciprocating hydraulic cylinder 64 may be coupled to the hydraulic circuit 42 by means of appropriate hoses or conduits 66. As noted above, and as will be appreciated by those skilled in the art, certain of these applications, particularly the hydraulic applications, may call for the use of additional valving, particularly for directional control and load holding. Such valving may be incorporated into the work vehicle or may be provided separately either in the application itself or intermediately between the service pack and the hydraulic actuators. It should also be noted that certain of the applications illustrated diagrammatically in FIG. 1 may be incorporated into the work vehicle itself. For example, the work vehicle may be designed to include a man lift, scissor lift, hydraulic tail gate, or any other driven systems which can be coupled to the service pack and driven separately from the main vehicle engine.

The service pack 12 may be physically positioned at any suitable location in the vehicle. In a presently contemplated embodiment, for example, the service engine 32 may be mounted on, beneath or beside the vehicle bed or work platform rear of the vehicle cab. In many such vehicles, for example, the vehicle chassis may provide convenient mechanical support for the engine and certain of the other components of the service pack. For example, steel tubing, rails or other support structures extending between front and rear axles of the vehicle may serve as a support for the service engine 32. It should be noted that, depending upon the system components selected and the placement of the service pack 12, reservoirs may be provided for storing hydraulic fluid and pressurized air (denoted HR and AR, respectively in FIG. 1). As will be appreciated by those skilled in the art, however, the hydraulic reservoir may be placed at various locations or even integrated into the service pack enclosure. Likewise, depending upon the air compressor selected, no reservoir may be required for compressed air.

In use, the service pack will provide power for the on-site applications completely separately from the vehicle engine. That is, the service engine 32 generally may not be powered during transit of the vehicle from one service location to another, or from a service garage or facility to a service site. Once located at the service site, the vehicle may be parked at a convenient location, and the main engine 18 may be shut down. The service engine 32 may then be powered, to provide service from one or more of the service systems described above. Where desired, clutches, or other mechanical engagement devices may be provided for engagement and disengagement of one or more of the generator, the hydraulic pump and the air compressor, depending upon these service are required. Moreover, as in conventional vehicles, where stabilization of the vehicle or any of the systems is require, the vehicle may include outriggers, stabilizers (not shown), and so forth which may be deployed after parking the vehicle and prior to operation of the service pack. One or more of the services provided by the work vehicle 10 may be performed without the need to operate the main vehicle engine at a service site.

Figure 2:
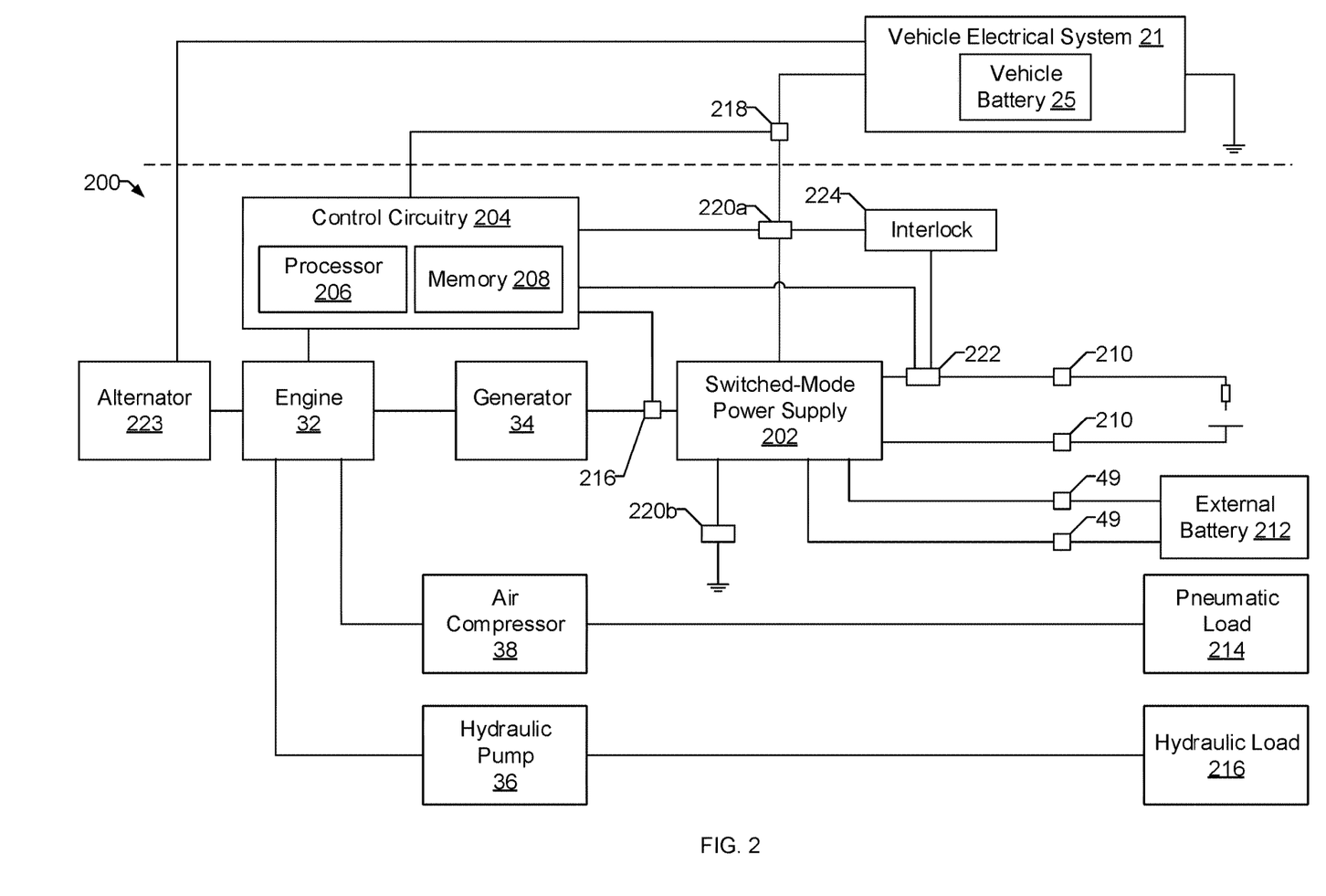
FIG. 2 is a block diagram of an example power system that may be used to implement the service pack of FIG. 1.

FIG. 2 is a block diagram of an example power system 200 that may be used to implement the service pack 12 of FIG. 1. The example power system 200 includes the service engine 32, the generator 34, the hydraulic pump 36, the air compressor 38, a switched-mode power supply 202, and control circuitry 204.

The switched-mode power supply 202 converts the electrical power from the generator 34 to output power. Generally, the switched-mode power supply 202 includes a rectifier, a boost converter, an inverter, a transformer, an output stage, and/or any other circuitry. However, other configurations of the switched-mode power supply 202 may be used. The output power may include welding-type power, and/or non-welding AC and/or DC electrical power (e.g., DC battery charging power). In some examples, the generator 34 outputs AC power at a predetermined voltage (e.g., 120 VAC, 240 VAC) and a predetermined frequency (e.g., 50 Hz, 60 Hz, 400 Hz).

While the example power system 200 includes the switched-mode power supply to provide electrical power, other example power systems may substitute or supplement the switched-mode power supply with any one or more of: a secondary switcher or other electronically controlled weld/battery charge output; a dedicated, low-voltage DC winding in the generator 34 to supple low-voltage DC power (e.g., 12 VDC, 24 VDC, etc.); a dedicated, plug-in type battery charge system that powered by the auxiliary power output of the generator 34 (e.g., via the AC receptacles 48 of FIG. 1); and/or a dedicated generator configured to produce DC power (e.g., 12 VDC, 24 VDC, etc.), driven by the engine 32 via a belt or transmission device(s).

The control circuitry 204 includes one or more processor(s) 206 and a machine readable memory 208 or other storage device to store instructions for execution by the processor(s) 206. The example control circuitry 204 controls the output of the switched-mode power supply 202 based on the desired load or task. In some examples, the control circuitry 204 and/or a separate engine control unit (ECU) control the speed of the engine 32, which controls an input to the switched-mode power supply 202 (via the generator 34). For example, the control circuitry 204 may control switching elements of the boost converter and/or the inverter stages of the switched-mode power supply 202 to control voltage, current, frequency, and/or other characteristics of the output from the switched-mode power supply 202. The control circuitry 204 may control the switched-mode power supply 202 to provide voltage-controlled welding power, current-controlled welding power, battery-charging power, AC power for electrical tools, and/or any other type of welding-type and/or non-welding-type electrical power, via power system output terminals. For example, the switched-mode power supply 202 may output welding-type power via welding terminals 210, and/or non-welding power via the DC receptacle 49. For example, the switched-mode power supply 202 may output DC power to charge an external battery 212 via the DC receptacle 49. Other power system output terminals may also be used to output the power from the switched-mode power supply 202 to a power system load.

The air compressor 38 provides air pressure to one or more pneumatic load(s) 212, such as pneumatically powered tools. The hydraulic pump 36 provides hydraulic power to one or more hydraulic load(s) 214.

The control circuitry 204 identifies whether there is an output load on the power system 200 and whether there is a load on the vehicle electrical system 21 (e.g., a vehicle load). For example, the power system 200 includes a sensor 216 configured to identify input current to the switched-mode power supply 202 and/or a sensor 218 configured to identify a load on the vehicle electrical system 21. For example, the sensor 216 may identify a voltage and/or current to the switched-mode power supply 202. In some examples, the sensor 216 may be located in the switched-mode power supply 202 and/or at an output of the switched-mode power supply 202, and/or the switched-mode power supply 202 may provide feedback to the control circuitry 204. The sensor 218 measures a voltage on the vehicle electrical system 21, such as an output voltage of the vehicle battery 25. When the output voltage of the vehicle battery 25 drops below a threshold voltage, the example control circuitry 204 determines that the vehicle battery 25 is to be charged.

In some other examples, the control circuitry 204 identifies whether there is a power system load and/or a vehicle load based on an input from a user input device, such as a switch, a knob, or other input device. For example, the user control panel 46 and/or the remote control panel 46A may include an input device configured to receive an input indicating the present load to be serviced (e.g., the vehicle load, the power system load, a welding load, a non-welding electrical load, etc.). In some examples, the user control panel 46 and/or the remote control panel 46A control a physical switch or circuitry that physically connects and/or disconnects the switched-mode power supply 202 and/or associated control circuitry 204 with the power system load and the vehicle load, respectively. In such examples, the control circuitry 204 may include multiple circuits to control the switched-mode power supply 202, corresponding to the different loads. The different circuits may then control the switched-mode power supply 202 when physically connected to the switched-mode power supply 202 (e.g., via the user control panel 46 and/or the remote control panel 46A), and may be idle when not connected.

In some examples, the power system load or the vehicle load is a default load for the power system 200, and the control circuitry 204 controls the switched-mode power supply 202 to output power to the default load (e.g., the power system load or the vehicle load) until the control circuitry 204 determines that the other load is to be powered (e.g., via detecting a load via the sensors 216, 218, via the user control panel 46, via the remote control panel 46A, etc.).

Example vehicle loads include at least one of charging the vehicle battery 25 or other vehicle energy storage device, jump starting the vehicle battery 25 or the battery of another vehicle, and/or an electrical load on the vehicle electrical system 21, such as electrically operated tools. Example power system loads include at least one of a welding-type load (e.g., gas metal arc welding (GMAW), shielded metal arc welding (SMAW), flux-cored arc welding (FCAW), gas tungsten arc welding (GTAW), plasma cutting, induction heating, gouging, and/or any other welding-type load), a battery charging load, a pneumatic load (e.g., electrically powering the air compressor 38 via the switched-mode power supply 202), a hydraulic load (e.g., electrically powering the hydraulic pump 36 via the switched-mode power supply 202), an alternating current (AC) electrical load, and/or any other type of non-welding electrical load.

When the output load is the power system load, the control circuitry 204 controls the switched-mode power supply 202 to provide the output power for output to the power system load. For example, the control circuitry 204 may control first contactors 220*a*, 220*b* to isolate the switched-mode power supply 202 from the vehicle electrical system 21 and control a second contactor 222 to couple the switched-mode power supply 202 to the welding terminals 210 and/or the receptacle 49. The control circuitry 204 further controls the switched-mode power supply 202 based on the type of the power system load, such as a type of welding process, a type of battery charging mode (e.g., rapid charging, trickle charging, etc.), an AC load, and/or any other type of electrical output.

Conversely, when the output load is the vehicle load, the control circuitry 204 controls the switched-mode power supply 202 to provide the output power for output to the vehicle electrical system 21 connected to the vehicle battery 25 by controlling the contactor 222 to isolate the switched-mode power supply 202 from the welding terminals 210, the DC receptacles 49, and/or any other output terminals of the power system 200, and controlling the contactors 220*a*, 220*b* to couple the switched-mode power supply 202 to the vehicle electrical system 21.

The example power system 200 includes an alternator 223, which provides electrical power to the vehicle electrical system 21, the vehicle battery 25, the engine 32, and/or components in the power system 200. The example alternator 223 is driven by the engine 32, and charges the vehicle battery 25 as needed. In some examples, the power system 200 is configured to share the vehicle battery 25 with the vehicle. The example alternator 223 does not provide sufficient electrical power to power electrical loads on the vehicle electrical system 21. The switched-mode power supply 202 extends the electrical supply capacity of the power system 200 to increase the electrical loads that can be powered while the vehicle engine is off. For example, the control circuitry 204 may identify when an electrical load exceeds the capacity of the alternator 223, and control the switched-mode power supply 202 to provide supplemental electrical power to the load (e.g., via the vehicle electrical system 21, via the DC receptacles 49, etc.).

Because the switched-mode power supply 202 may be used to provide electrical power to the vehicle electrical system 21 and/or the vehicle battery 25, some other example power systems do not include an alternator. Instead, the switched-mode power supply 202 provides the electrical current to loads that were powered using an alternator in conventional systems. Thus, the example switched-mode power supply 202 or the alternator 223 may be used as a single source of electrical power to a load such as the vehicle electrical system 21, or the switched-mode power supply 202 and the alternator 223 may be controlled to simultaneously provide electrical power to the load.

The example power system 200 includes an interlock 224 coupled to the contactors 220*a*, 220*b*, 222. The interlock 224 prevents connection of the switched-mode power supply 202 to the vehicle electrical system 21 while the contactor 222 is coupling the switched-mode power supply 202 to the welding terminals 210. For example, the interlock 224 includes switches and other circuitry to prevent both contactors 220*a*, 220*b*, 222 from being in a closed state at the same time. An example implementation of the interlock 114 and the contactors 220*a*, 220*b*, 222 is described in U.S. patent application Ser. No. 15/833,445, filed Dec. 6, 2017, entitled "System and Method for Preventing High Voltage on a Low Voltage Output in a Welding-Type System." The entirety of U.S. patent application Ser. No. 15/833,445 is incorporated herein by reference.

In some examples, the switched-mode power supply 202 is coupled to one or more electrical circuits or systems that are isolated from the vehicle electrical system 21. For example, an electric or electric over hydraulic crane system may include a separate energy storage device to provide power, and the switched-mode power supply 202 is coupled to the crane system to charge the energy storage device and/or provide electrical power to the crane system.

Figure 3:
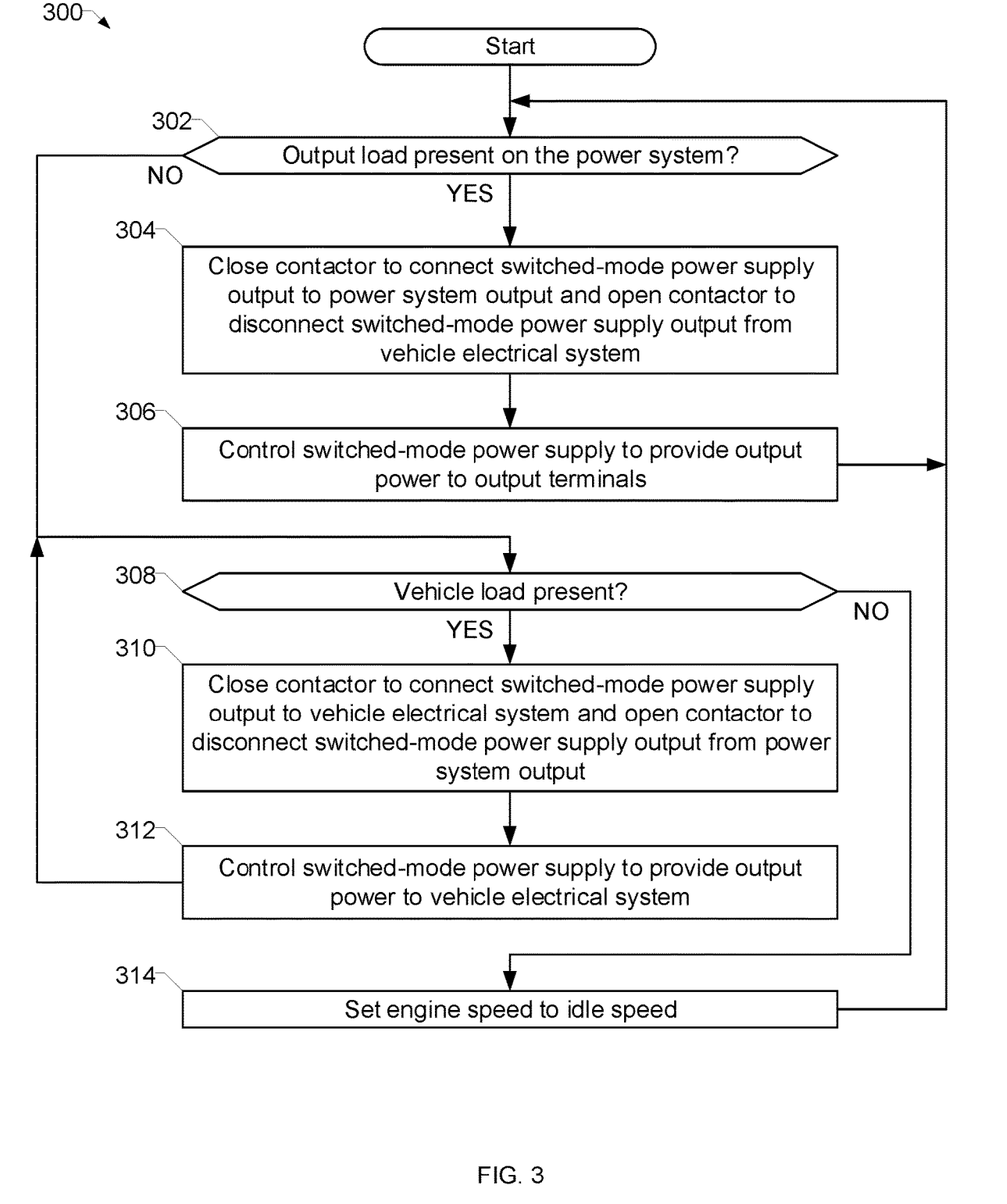
FIG. 3 is a flowchart representative of example machine readable instructions which may be executed by the example control circuitry to use a switched-mode power supply as a source of power in a service pack.

FIG. 3 is a flowchart representative of example machine readable instructions 300 which may be executed by the example control circuitry 204 to use a switched-mode power supply as a source of power in a service pack (e.g., the power system 200 of FIG. 2). The example instructions 300 will be described with reference to the power system 200 of FIG. 2. The instructions 300 may be executed while the engine 32 is running.

At block 302, the control circuitry 204 determines whether an output load is present on the power system 200 (e.g., whether a load is a power system load). For example, the control circuitry 204 may identify the power system load based on a user input device and/or by detecting the power system load via the sensor 216. When an output load is present on the power system 200 (block 302), at block 304 the control circuitry 204 closes the contactor 222 to connect the output of the switched-mode power supply 202 to one or more power system outputs, such as the welding terminals 210 and/or the DC receptacles 49. The control circuitry 204 also opens the contactors 220*a*, 220*b* to disconnect or isolate the switched-mode power supply 202 from the vehicle electrical system 21.

At block 306, the control circuitry 204 controls the switched-mode power supply 202 to provide output power to the output terminals (e.g., the welding terminals 210 and/or the DC receptacles 49). For example, the control circuitry 204 may control the switched-mode power supply 202 based on the type of load (e.g., a welding-type load, a battery charging load, a pneumatic load, a hydraulic load, an alternating current (AC) electrical load, and/or any other type of non-welding electrical load. The control circuitry 204 returns control to block 302.

When an output load is not present on the power system 200 (block 302), at block 308 the control circuitry 204 determines whether a vehicle load is present. For example, the control circuitry 204 may identify the vehicle load based on a user input device and/or by detecting the vehicle load via the sensor 216. When the vehicle load is present (block 308), at block 310 the control circuitry 204 closes the contactors 220*a*, 220*b* to connect the output of the switched-mode power supply 202 to the vehicle electrical system 21. The control circuitry 204 also opens the contactor 222 to disconnect or isolate the switched-mode power supply 202 from the power system outputs, such as the welding terminals 210 and/or the DC receptacles 49.

At block 312, the control circuitry 204 controls the switched-mode power supply 202 to provide output power to the vehicle electrical system 21. For example, the control circuitry 204 may control the switched-mode power supply 202 based on the type of the vehicle load, such as charging the vehicle battery 25 or other vehicle energy storage device, jump starting the vehicle battery 25 or the battery of another vehicle, and/or an electrical load on the vehicle electrical system 21. The control circuitry 204 returns control to block 308.

When the vehicle load is not present (block 308) (e.g., there is no load on the system), the control circuitry 204 sets the speed of the engine 32 to an idle speed. In some examples, the control circuitry 204 may shut down the engine 32 when there is no load, and/or start the engine 32 in response to detecting a power system load and/or a vehicle load. After setting the engine speed (block 314), control returns to block 302 to monitor for a load.

In some examples in which the power system load is a default or priority load, the instructions 300 may transfer control to block 302 following block 312 to repeatedly or continually check whether the default or priority power system load is present before continuing to control the switched-mode power supply 202 to output the power to the non-priority or non-default vehicle load. Conversely, the blocks 302-312 may be re-arranged to treat the vehicle load as the default or priority load.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present disclosure. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A power system, comprising:
   an engine;
   a generator configured to generate alternating current (AC) electrical power from mechanical power delivered by the engine;
   a switched-mode power supply configured to convert the AC electrical power from the generator to output power;
   control circuitry configured to:
      when an output load of the switched-mode power supply is a power system load, control the switched-mode power supply to provide the output power for output to the power system load; and
      when the output load of the switched-mode power supply is a vehicle load, control the switched-mode power supply to provide the output power for output to a vehicle electrical system connected to a vehicle energy storage device;
   a first contactor configured to selectively isolate the switched-mode power supply from the vehicle electrical system; and
   a second contactor configured to selectively couple the switched-mode power supply to output terminals for the power system, wherein the control circuitry is configured to control the first contactor to isolate the switched-mode power supply from the vehicle electrical system and control the second contactor to couple the switched-mode power supply to the output terminals when the output load is the power system load.

2. The power system as defined in claim 1, wherein the control circuitry is configured to control the first contactor to couple the switched-mode power supply to the vehicle electrical system and control the second contactor to isolate the switched-mode power supply from the output terminals when the output load is the vehicle load.

3. The power system as defined in claim 1, further comprising an interlock configured to prevent connection of the switched-mode power supply to the vehicle electrical system while the second contactor is coupling the switched-mode power supply to the output terminals.

4. The power system as defined in claim 1, wherein the vehicle load comprises at least one of charging the vehicle energy storage device, jump starting the vehicle energy storage device or another vehicle energy storage device, or an electrical load on the vehicle electrical system.

5. The power system as defined in claim 1, wherein the power system load comprises at least one of a welding-type load, a battery charging load, a direct current load, a pneumatic load, a hydraulic load, or an alternating current load.

6. The power system as defined in claim 1, wherein the control circuit is configured to:
   determine a power system load is present; and
   in response to determining that the power system load is present, control the switched-mode power supply to provide the output power to the power system load.

7. The power system as defined in claim 1, wherein the power system does not include an alternator.

8. The power system as defined in claim 1, wherein the control circuitry is configured to identify the power system load or the vehicle load based on an input from a user input device.

9. The power system as defined in claim 1, wherein the control circuitry is configured to identify the power system load or the vehicle load based on detecting the power system load via a first sensor or the vehicle load via a second sensor.

10. The power system as defined in claim 1, wherein the control circuitry is configured to identify the power system load or the vehicle load as the output load for the switched-mode power supply.

11. The power system as defined in claim 1, wherein the control circuitry is configured to identify the power system load as a priority load.

\* \* \* \* \*